(12) United States Patent
Panzer (10) Patent No.: US 7,639,051 B2
(45) Date of Patent: Dec. 29, 2009

(54) CIRCUIT ARRANGEMENT FOR RECTIFYING THE OUTPUT VOLTAGE OF A SENSOR THAT IS FED BY AN OSCILLATOR

(75) Inventor: Karlheinz Panzer, Schwebheim (DE)

(73) Assignee: Bosch Rexroth AG, Stuttgart (DE)

( * ) Notice: Subject to any disclaimer, the term of this patent is extended or adjusted under 35 U.S.C. 154(b) by 1196 days.

(21) Appl. No.: 10/501,650

(22) PCT Filed: Mar. 8, 2003

(86) PCT No.: PCT/DE03/00749

§ 371 (c)(1),
(2), (4) Date: Mar. 17, 2005

(87) PCT Pub. No.: WO03/081181

PCT Pub. Date: Oct. 2, 2003

(65) Prior Publication Data

US 2005/0156599 A1    Jul. 21, 2005

(30) Foreign Application Priority Data

Mar. 22, 2002 (DE) ................................ 102 12 813

(51) Int. Cl.
H03K 4/06 (2006.01)
(52) U.S. Cl. ........................................ 327/134; 327/330
(58) Field of Classification Search .................. 327/134, 327/131
See application file for complete search history.

(56) References Cited

U.S. PATENT DOCUMENTS 7,276,861 B1 * 10/2007 Shteynberg et al. ......... 315/291

FOREIGN PATENT DOCUMENTS

| DE | 35 18 001 | 11/1986 |
|---|---|---|
| DE | 41 05 642 | 9/1992 |
| DE | 4105642 C2 * | 9/1993 |
| DE | 42 31 989 | 1/1994 |
| DE | 4231989 C1 * | 1/1994 |
| DE | 42 31 616 | 3/1994 |
| DE | 44 27 547 | 2/1996 |
| WO | WO 02 10674 | 2/2002 |

* cited by examiner

*Primary Examiner*—Lincoln Donovan
*Assistant Examiner*—Ryan C Jager
(74) *Attorney, Agent, or Firm*—Lucas & Mercanti, LLP (57) ABSTRACT

In the case of a measuring device having a sensor supplied from an oscillator for a non-electrical variable and having a circuit arrangement downstream of the sensor for rectifying the output voltage of the sensor, interference pulses, which are superimposed on the output voltage of the movement sensor and are rectified when the output voltage of the movement sensor is rectified, falsify the measurement result. This is particularly true for spiked interference pulses having a high amplitude. In order to reduce such falsifications of the measurement result, the output voltage of the sensor is supplied to a ramp-generating circuit arrangement, in which the mathematical sign of the transmission behavior can be controlled. The mathematical sign of the transmission behavior of the ramp-generating circuit arrangement is controlled by a switching signal, whose flanks correspond to the zero crossings of the output voltage of the sensor. Such circuit arrangements can advantageously be used in measuring devices for non-electrical variables having sensors which are supplied with an alternating current. These include, for example, movement transducers having sensors which convert the position of a moveable component to an electrical output signal, in particular in the form of an electrical DC voltage. The moveable component may be the control piston of a pneumatic or hydraulic valve.

27 Claims, 5 Drawing Sheets

CIRCUIT ARRANGEMENT FOR RECTIFYING THE OUTPUT VOLTAGE OF A SENSOR THAT IS FED BY AN OSCILLATOR

FIELD AND BACKGROUND OF THE INVENTION

The invention relates to a circuit arrangement for rectifying the output voltage of a sensor supplied from an oscillator for a non-electrical variable, whose amplitude and phase angle is a measure of the non-electrical variable.

Circuit arrangements such as this form, together with a sensor and an oscillator, which supplies current to the sensor, a measuring device which converts a non-electrical variable, for example a movement distance or a pressure, to an electrical variable, in particular to an electrical voltage, which is a measure of the non-electrical variable. The oscillator supplies the sensor with an AC voltage having a constant frequency and amplitude. The non-electrical variable influences the transmission behavior of the sensor. The amplitude and the phase angle of the output voltage are therefore a measure of the non-electrical variable to be measured. The sensor may be, for example, an inductively or capacitively operating movement sensor, whose transmission behavior can be altered by the deflection of a coupling element. The output voltage of the sensor, which is present in the form of a modulated AC voltage, is converted to a DC voltage for further processing. The AC voltage which is modulated corresponding to the deflection of the coupling element is in this case converted such that the mathematical sign and the level of the DC voltage are a measure of the position of the coupling element. The output voltage of the sensor is made up of the carrier signal, which is referred to below as the useful signal and is modulated corresponding to the deflection of the coupling element, and of interference signals which are superimposed on this carrier signal. The interference signals are picked up, in particular, by means of the output-side lines of the sensor or by means of other lines connected thereto. The frequency of the interference signals is generally considerably higher than the frequency of the useful signal. Interference pulses which are superimposed on the useful signal are fed, together with the useful signal, to the circuit arrangement for converting the output voltage of the sensor to a DC voltage. The interference signals are rectified together with the useful signal and therefore falsify the measurement result. This is particularly true for spiked interference pulses having a high amplitude.

SUMMARY OF THE INVENTION

The invention is based on the object of creating a circuit arrangement of the type described initially which reduces falsification of the measurement result by means of interference signal components, which are superimposed on the useful signal, of the voltage supplied to the circuit arrangement.

This object is achieved by the features characterized in claim 1. The ramp generator used in connection with the rectification of the output voltage of the sensor acts as a nonlinear filter, which limits in particular interference pulses having a steep rise and a high amplitude and, at the same time, passes on, unimpeded, the useful signals in the small-signal range. These measures improve the signal quality of the rectified voltage and thus also improve the EMC properties of a measuring device formed from the sensor and the circuit arrangement for rectifying the output voltage of the sensor. The letters EMC are in this context a conventional abbreviation for "electromagnetic compatibility".

Advantageous refinements of the invention are characterized in the subclaims. Claims 2 and 3 describe measures for generating the switching signal, which controls the mathematical sign of the transmission behavior, from the output voltage of the oscillator. Claims 4 to 18 describe various possibilities for implementing ramp-generating circuit arrangements, in which the mathematical sign of the transmission behavior can be controlled. Claims 4 to 13 describe details of such circuit arrangements, which comprise an amplifier circuit having a gain with a controllable mathematical sign and a downstream ramp generator without mathematical sign-inversion means. Claims 5 and 6 relate to refinements of an amplifier stage having a gain with a controllable mathematical sign. Claims 7 to 9 relate to refinements of ramp generators having an inverting transmission behavior. Claims 10 to 13 relate to refinements of ramp generators having a non-inverting transmission behavior. Claims 14 to 18 describe details of ramp generators, in which the means for controlling the mathematical sign of the transmission behavior is integrated in the ramp generator. An upstream, separate amplifier having a gain with a mathematical sign which can be inverted is not required in this refinement. The measures in claim 17 make it possible to provide the same ramp steepness both for rising and for falling signals. The capacitor specified in claim 18 prevents any undefined oscillatory behavior when the ramp generator is fed small input signals. In order for the useful component of the output voltage of the sensor not to be falsified by the ramp generator, the ramp steepness as claimed in claim 19 is advantageously selected such that it is greater than the maximum steepness of the useful signal. In this case, however, care should be taken to ensure that the ramp steepness is selected to be as small as possible for the purpose of limiting interference pulses more effectively. As claimed in claims 20 to 22, additional smoothing of harmonics of the output voltage of the ramp generator takes place by means of downstream, linear filters, for example in the form of active bandpass filters which are advantageously in the form of Bessel filters. These filters may be dimensioned in a simple manner, in contrast to nonlinear filters, such that the limit frequency has a desired value. A matching circuit as claimed in claim 23 amplifies the output signal of the sensor. A further matching circuit as claimed in claim 24 makes it possible to use different reference potentials for the sensor and for the circuit arrangement downstream thereof. Claim 25 describes an advantageous refinement for a matching circuit as claimed in claims 23 or 24 which suppresses symmetrical interference in the output voltage of the sensor. Claims 26 and 27 describe various refinements for a sensor for detecting the non-electrical variable.

BRIEF DESCRIPTION OF THE DRAWINGS

Further details of the invention are described in more detail below with reference to exemplary embodiments illustrated in the drawings, in which.

DETAILED DESCRIPTION OF THE PREFERRED EMBODIMENT(S)

Figure 1:
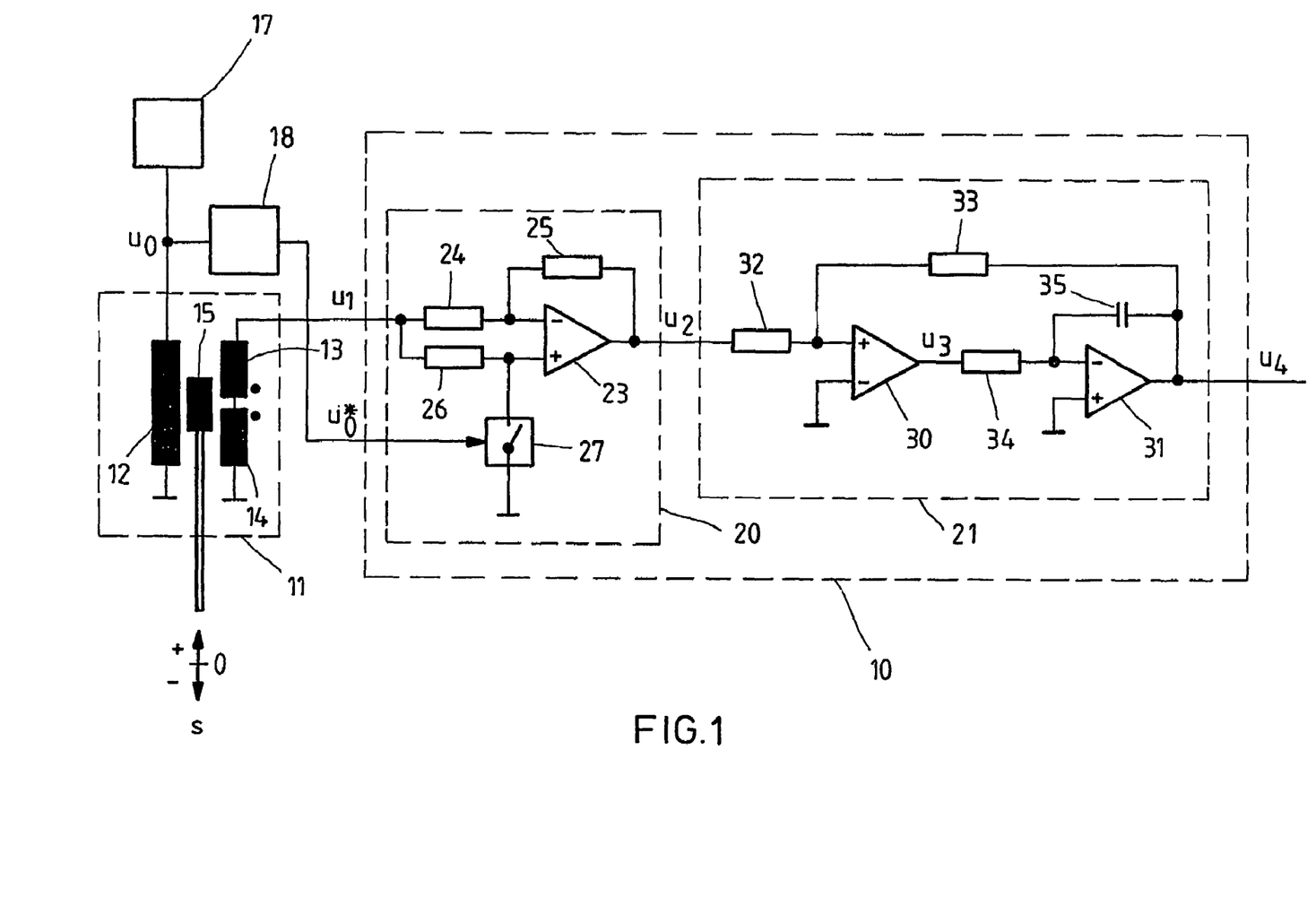
FIG. 1 shows a sensor, which is supplied from an oscillator and is in the form of an inductive movement sensor, and a first circuit arrangement, downstream thereof, for rectifying the output voltage of the movement sensor according to the invention.

FIG. 1 shows the circuit diagram of a movement transducer having a first rectifying and ramp-generating circuit arrangement 10 according to the invention. Such movement transducers are used, for example, to convert the deflection of the control piston of a pneumatic or hydraulic valve from its central position to an electrical signal. The circuit arrangement 10 is supplied the output voltage $u_1$ of a sensor in the form of an inductive movement sensor 11. The movement sensor 11 is provided with a primary winding 12 and two secondary windings 13 and 14. A moveable ferromagnetic core 15 is arranged between the primary winding 12 and the secondary windings 13, 14, and its position is given the reference s. The core 15 can be deflected upwards or downwards from its central position illustrated in FIG. 1. When the core 15 is in its central position, s=0. Upward deflections are identified below by positive values of s. Correspondingly, downward deflections are identified by negative values of s. The primary winding 12 is supplied the output voltage $u_0$ of an oscillator 17, whose time characteristic is sinusoidal in this exemplary embodiment. However, a triangular or square-wave characteristic of the output voltage $u_0$ of the oscillator 17 is also possible, for example. The turns of the secondary windings 13 and 14 are arranged such that the voltages induced in them oppose one another. If, when s=0, the core 15 is in the central position, the voltages induced in the secondary windings 13 and 14 are equally high in value. Since the voltages in the secondary windings oppose one another, however, the amplitude of the resulting voltage $u_1$ is equal to zero. Let us first consider a positive deflection of the core 15. Here, the amplitude of the voltage $u_1$ increases when the core 15 is deflected further in the positive direction. The voltage $u_1$ is in an ideal case, i.e. when the movement sensor is in the form of an ideal transformer, in phase with the voltage $u_0$. However, in practice, it cannot generally be assumed that an ideal transformer is being used. The voltage $u_1$ is therefore in practice shifted with respect to the voltage $u_0$ through a fixed angle $\Delta\phi$, the size of which is determined by the design of the movement sensor. The phase shift $\Delta\phi$ is independent of the degree of deflection of the core 15 and is of an order of magnitude of 10°. In the case of a negative deflection of the core 15, the phase angle of the voltage $u_1$ is shifted through 180° with respect to the value $\Delta\phi$, which results when there is a positive deflection of the core 15. In this case there is a phase shift of the voltage $u_1$ with respect to the voltage $u_0$ which is only dependent on the direction of the deflection of the core 15. As is illustrated in FIG. 1, the deflection of the core 15 of the movement sensor 11 may be a longitudinal movement or else, for example, a rotary movement.

The output voltage $u_0$ of the oscillator 17 is also supplied to a signal conditioner 18. The signal conditioner 18 has, in addition to a comparator function, a dead time $\Delta t$. The signal conditioner 18 generates, in the zero crossings of the voltage $u_0$, a switching signal and shifts its flanks through the dead time $\Delta t$. The duration of the dead time $\Delta t$ is in this case dimensioned such that, taking into account the frequency of the voltage $u_0$, the flanks of the resulting switching signal, which is referred to below as $u_0^*$, are shifted with respect to the zero crossings of the voltage $u_0$ through the angle $\Delta\phi$. This means that the flanks of the switching signal $u_0^*$ correspond to the zero crossings of the useful signal component of the voltage $u_1$. This type of generation of the switching signal $u_0^*$ has the advantage, as compared with direct generation of the switching signal from the voltage $u_1$, that the phase angle of the switching signal can be coupled uniquely to the voltage $u_0$, and that a signal which is suitable as a switching signal is available even when the amplitude of the voltage $u_1$ is very small or equal to zero.

The ramp-generating circuit arrangement 10 illustrated in FIG. 1 comprises an amplifier circuit 20 having a gain with a controllable mathematical sign and a ramp generator 21, downstream thereof, having an inverting transmission behavior. The amplifier circuit 20 has an operational amplifier 23, whose output voltage is given the reference $u_2$. The voltage $u_2$ is at the same time the output voltage of the amplifier circuit 20. The inverting input of the operational amplifier 23 is supplied the voltage $u_1$ via a resistor 24 and the voltage $u_2$ via a resistor 25. The non-inverting input of the operational amplifier 23 is supplied the voltage $u_1$ via a resistor 26. In addition, an electronic switch 27 is arranged between the non-inverting input of the operational amplifier 23 and the reference potential. The electronic switch 27 is fed the switching signal $u_0^*$ as a control signal. When the switch 27 is closed, the non-inverting input of the operational amplifier 23 is connected to the reference potential. When the switch 27 is closed, the amplifier circuit 20 behaves as an inverting amplifier. If the resistors 24 and 25 are selected to have the same resistance value, the gain $V=-1$, i.e. the relationship $u_2=-u_1$ for the voltage $u_2$. If, on the other hand, the switch 27 is open, the amplifier circuit 20 behaves as a non-inverting amplifier having the gain $V=+1$, i.e. the relationship $u_2=u_1$ applies for the voltage $u_2$.

The ramp generator 21 has two operational amplifiers 30 and 31, whose output voltages are given the references $u_3$ and $u_4$, respectively. The voltage $u_4$ is at the same time the output voltage of the ramp generator 21 and of the ramp-generating circuit arrangement 10. The non-inverting input of the operational amplifier 30 is supplied the voltage $u_2$ via a resistor 32 and the voltage $u_4$ via a resistor 33. In order for the voltages $u_2$ and $u_4$ to have the same magnitude in the steady state, the resistors 32 and 33 are selected to have the same resistance value. The inverting input of the operational amplifier 30 is connected to the reference potential. The inverting input of the operational amplifier 31 is supplied the voltage $u_3$ via a resistor 34 and the voltage $u_4$ via a capacitor 35. The non-inverting input of the operational amplifier 31 is connected to the reference potential. The operational amplifier 31, the resistor 34 and the capacitor 35 form an integrator in a manner known per se. The rate of rise of the voltage $u_4$ is determined by the value of the resistor 34 and the capacitor 35, which form the time constants of the integrator, and by the level of the voltage $u_3$ supplied to the resistor 34. In the event of a sudden change in the voltage $u_2$, the voltage $u_3$ is equal to the positive or the negative supply voltage of the operational amplifier 30, depending on whether the difference between the voltages $u_2$ and $u_4$ is positive or negative. The voltage $u_4$ follows the voltage $u_2$ according to a ramp function, until the voltage $u_4$, owing to the inverting transmission behavior of the ramp generator 21, is equal to $-u_2$. Interference signals contained in the voltage $u_2$ are limited according to the invention by the ramp generator 21. This limiting is effective in particular in the case of spiked interference signals. The ramp steepness of the ramp generator 21 is selected so that it is as small as possible so that interference is effectively limited, but is greater than the maximum steepness of the useful signal so that the useful signal of the output voltage $u_1$ of the movement sensor 11 is passed on largely without being influenced. For the purpose of reducing zero errors, a resistor (not shown in FIG. 1) can be connected in each case between the inverting input of the operational amplifier 30 and the reference potential and between the non-inverting input of the operational amplifier 31 and the reference potential.

Figure 2:
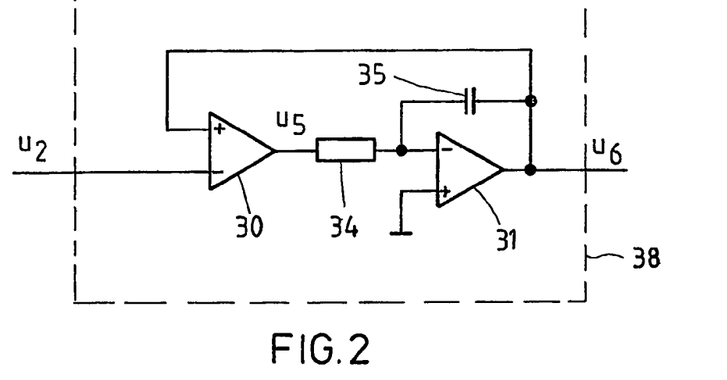
FIG. 2 shows a non-inverting ramp generator.

FIG. 2 shows a ramp generator 38 having a non-inverting transmission behavior, which can be used in place of the ramp generator 21 shown in FIG. 1 having an inverting transmission behavior. Insofar as the components shown in FIG. 2 correspond with those in FIG. 1, they are provided with the same references. The voltage $u_2$ is supplied directly to the inverting input of the operational amplifier 30. Since the ramp generator 38 has a non-inverting transmission behavior, the output voltage of the operational amplifier 31, which is at the same time the output voltage of the ramp generator 38, is not provided with the reference $u_4$ but with the reference $u_6$. For the same reason, the output voltage of the operational amplifier 30 is not provided with the reference $u_3$ but with the reference $u_5$. In order to reduce zero errors, a resistor (not shown in FIG. 2) can be connected between the non-inverting input of the operational amplifier 31 and the reference potential.

Figure 3:
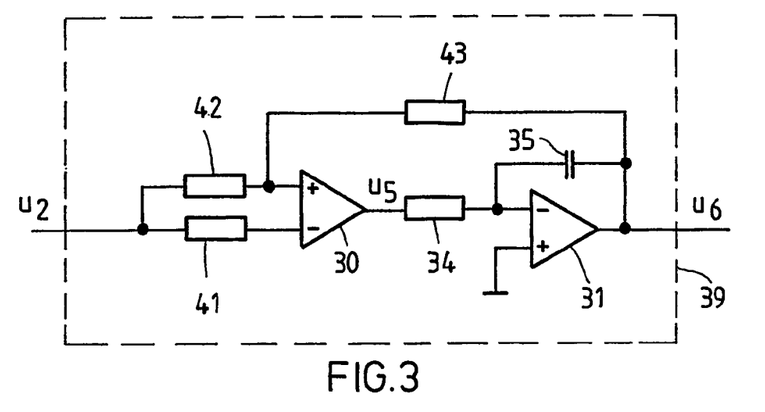
FIG. 3 shows a refinement of the non-inverting ramp generator illustrated in FIG. 2.

FIG. 3 shows a further ramp generator 39 having a non-inverting transmission behavior. In contrast to the ramp generator 38 shown in FIG. 2, three further resistors 41, 42 and 43 are provided. These three resistors do not effect any fundamental change to the transmission behavior of the ramp generator 39 with respect to that of the ramp generator 38. The references $u_5$ and $u_6$, respectively, are therefore used, as in FIG. 2, for the output voltages of the operational amplifiers 30 and 31. Since no current flows through the resistor 41, there is no voltage across it, with the result that the voltage supplied to the inverting input of the operational amplifier 30 is in this case also equal to $u_2$. The voltage supplied to the non-inverting input of the operational amplifier 30 is set such that it is equal to the voltage $u_2$ supplied to the inverting input. This is the case when the voltage $u_6$ is equal to the voltage $u_2$. As is explained in detail with reference to FIG. 4 below, a ramp generator having an inverting transmission behavior is obtained when the inverting input of the operational amplifier 30 is connected to the reference potential. Apart from the resistor 41, across which there is in this case the voltage $u_2$, such a ramp generator corresponds to the ramp generator 21 shown in FIG. 1. In this circuit arrangement, too, a resistor (not shown in FIG. 3) can be connected between the non-inverting input of the operational amplifier 31 and the reference potential for the purpose of reducing zero errors.

Figure 4:
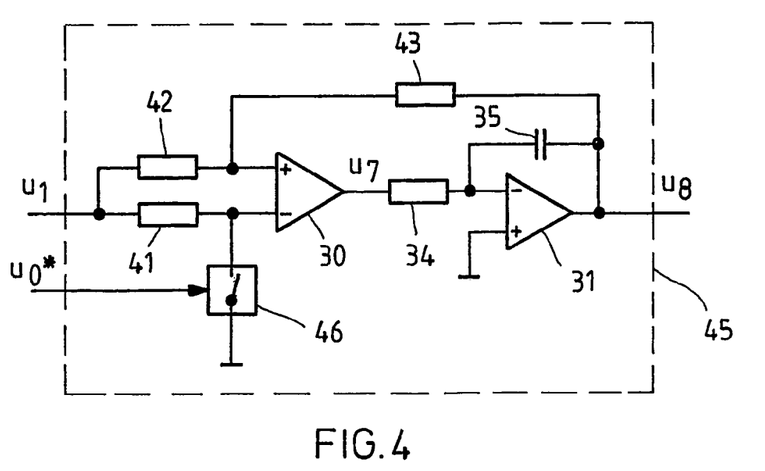
FIG. 4 shows a second circuit arrangement according to the invention for rectifying the output voltage of a sensor supplied from an oscillator and having a ramp generator, which can be switched over, starting from the ramp generator illustrated in FIG. 3, from non-inverting to inverting transmission behavior.

FIG. 4 shows a ramp generator 45, which can be switched over from non-inverting to inverting transmission behavior, and whose output voltage is given the reference $u_8$. This ramp generator is a refinement of the ramp generator 39 shown in FIG. 3, in which, in addition, an electronic switch 46 is arranged between the inverting input of the operational amplifier 30 and the reference potential. If the switch 46 is closed, the ramp generator 45 has an inverting transmission behavior, i.e. the mathematical sign of the voltage $u_8$ opposes the mathematical sign of the voltage $u_1$ supplied to the ramp generator 45 as an input voltage. If, on the other hand, the switch 46 is open, the ramp generator 45 has a non-inverting transmission behavior, i.e. the mathematical sign of the voltage $u_8$ is equal to the mathematical sign of the voltage $u_1$. In order for the voltages $u_1$ and $u_8$ to have the same value even in the case of an inverting transmission behavior in the steady state, the resistors 42 and 43 are selected to have the same resistance value. Since, as mentioned above, the mathematical sign of the transmission behavior of the ramp generator 45 can be inverted, the ramp-generating circuit arrangement 20, which is formed from the amplifier circuit 20 and one of the ramp generators 21 or 38 without mathematical sign-inversion means, can be replaced by the controlled ramp generator 45, in which the inversion of the mathematical sign of the transmission behavior is actually integrated in the ramp generator. Since, in this case, the amplifier circuit 20 shown in FIG. 1 is not necessary, the ramp generator 45 is supplied the output voltage $u_1$ of the movement sensor 11 as the input voltage. The switch 46 and thus the mathematical sign of the transmission behavior of the ramp generator 45 are controlled by the switching signal $u_0^*$. In this circuit arrangement, too, a resistor (not shown in FIG. 4) can be connected between the non-inverting input of the operational amplifier 31 and the reference potential for the purpose of reducing zero errors.

Figure 5:
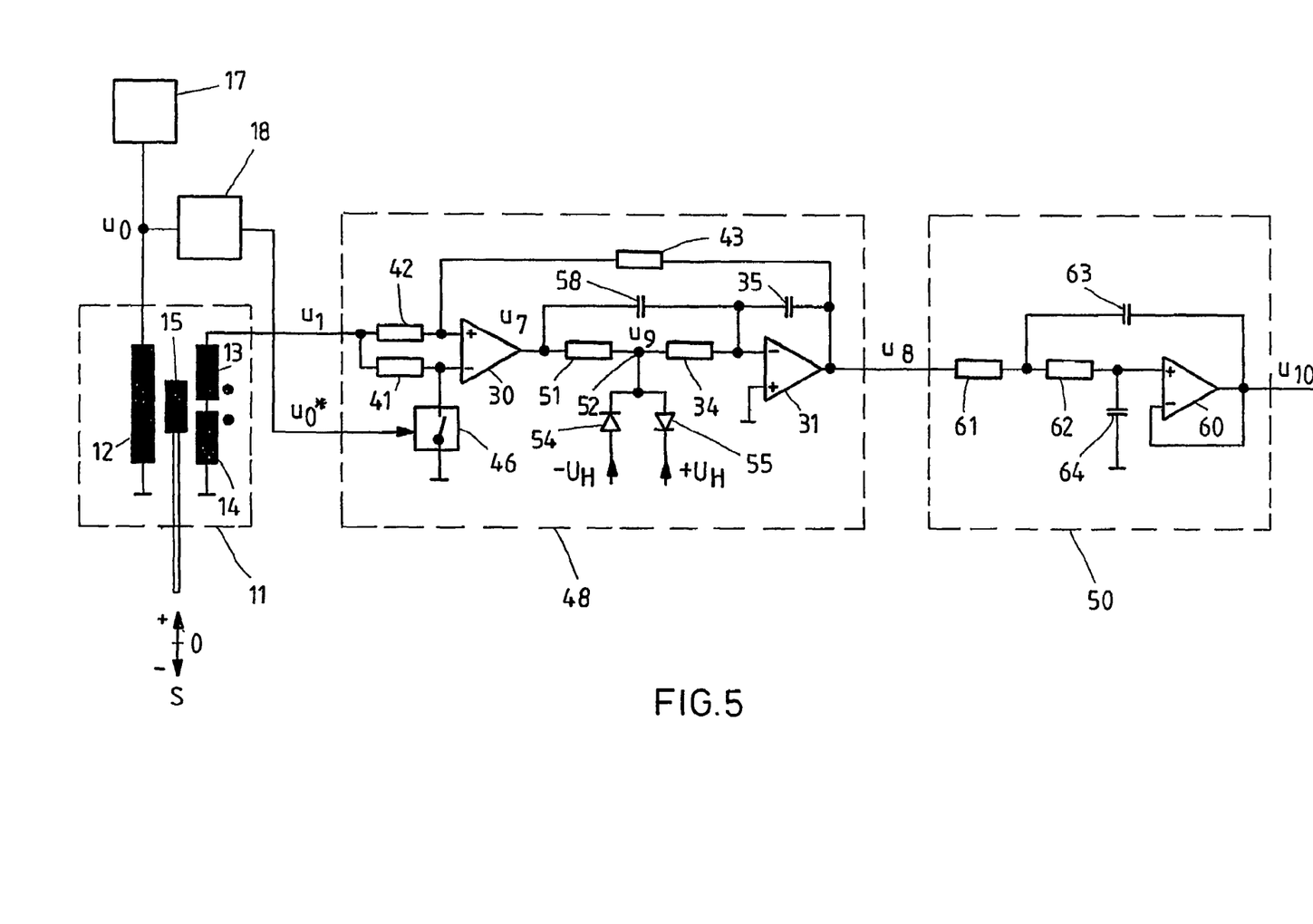
FIG. 5 shows a sensor, which is in the form of an inductive movement sensor and is supplied from an oscillator, a ramp generator which is modified in contrast to FIG. 4 and a linear filter downstream thereof.

FIG. 5 shows the circuit diagram of a further movement transducer. With this movement transducer, the output voltage $u_1$ of the inductive movement sensor 11 which is supplied from the oscillator 17 is supplied to a ramp generator 48 according to the invention, in which the mathematical sign of the transmission behavior can be controlled. A linear filter 50 is connected downstream of the ramp generator 48. The ramp generator 48 is a refinement of the ramp generator 45 shown in FIG. 4. Insofar as the components shown in FIG. 5 correspond to those in FIGS. 1 and 4, they are provided with the same references as are provided there. A further resistor 51 is arranged between the output of the operational amplifier 30 and the resistor 34. The connecting point between the two resistors is provided with the reference 52. The switching point 52 is connected via a diode 54 to a negative auxiliary voltage $-U_H$ and via a further diode 55 to a positive auxiliary voltage $+U_H$ having the same value. The auxiliary voltages $-U_H$ and $+U_H$ limit the voltage given the reference $u_9$ at the switching point 52, which is supplied to the integrator formed from the operational amplifier 31, the resistor 34 and the capacitor 35, to a value which, when the mathematical sign of the voltage $u_7$ is negative, is smaller than the auxiliary voltage $-U_H$ by the conducting-state voltage of the diode 54, and, when the mathematical sign of the voltage $u_7$ is positive, is greater than the auxiliary voltage $+U_H$ by the conducting-state voltage of the diode 55. This provides for the ramp steepness both for rising and for falling signals to be the same in value. The value for the auxiliary voltages $-U_H$ and $+U_H$ is selected to be smaller than the voltage $u_7$ when the operational amplifier 30 is overloaded. A capacitor 58 is arranged in parallel with the series circuit comprising the resistors 34 and 51. The capacitor 58 prevents the ramp generator 48 from having an undefined oscillatory behavior when the signals fed to its input are small. In order to reduce zero errors, a resistor (not shown in FIG. 5) can be connected between the non-inverting input of the operational amplifier 31 and the reference potential.

The voltage $u_8$ is a DC voltage, which is superimposed on by harmonics having double the frequency of the output voltage $u_0$ of the oscillator 17. The linear filter 50 downstream of the ramp generator 48 smoothes these harmonics of the voltage us in a manner known per se. The filter 50 is an active, second-order bandpass filter having simple positive feedback which is preferably in the form of a Bessel filter. The filter 50 contains an operational amplifier 60, two resistors 61 and 62 and two capacitors 63 and 64. Such a filter is known, for example, from the book by Tietze-Schenk "Halbleiter-Schaltungstechnik", [Semiconductor Switching Technology], Springer-Verlag 1986, 8th revised edition, pages 405 to 407, in particular FIG. 14.22 on page 406. The output voltage of the bandpass filter 50 is given the reference $u_{10}$. The voltage $u_{10}$ is a measure of the deflection of the core 15 of the inductive movement sensor 11. The polarity of the voltage $u_{10}$ is in this case a measure of the direction of the deflection, and the level of the voltage $u_{10}$ is a measure of the degree of deflection of the core 15 from its central position. If more pronounced smoothing of the harmonics is required, further filters of this type can be connected downstream of the filter 50.

Figure 6:
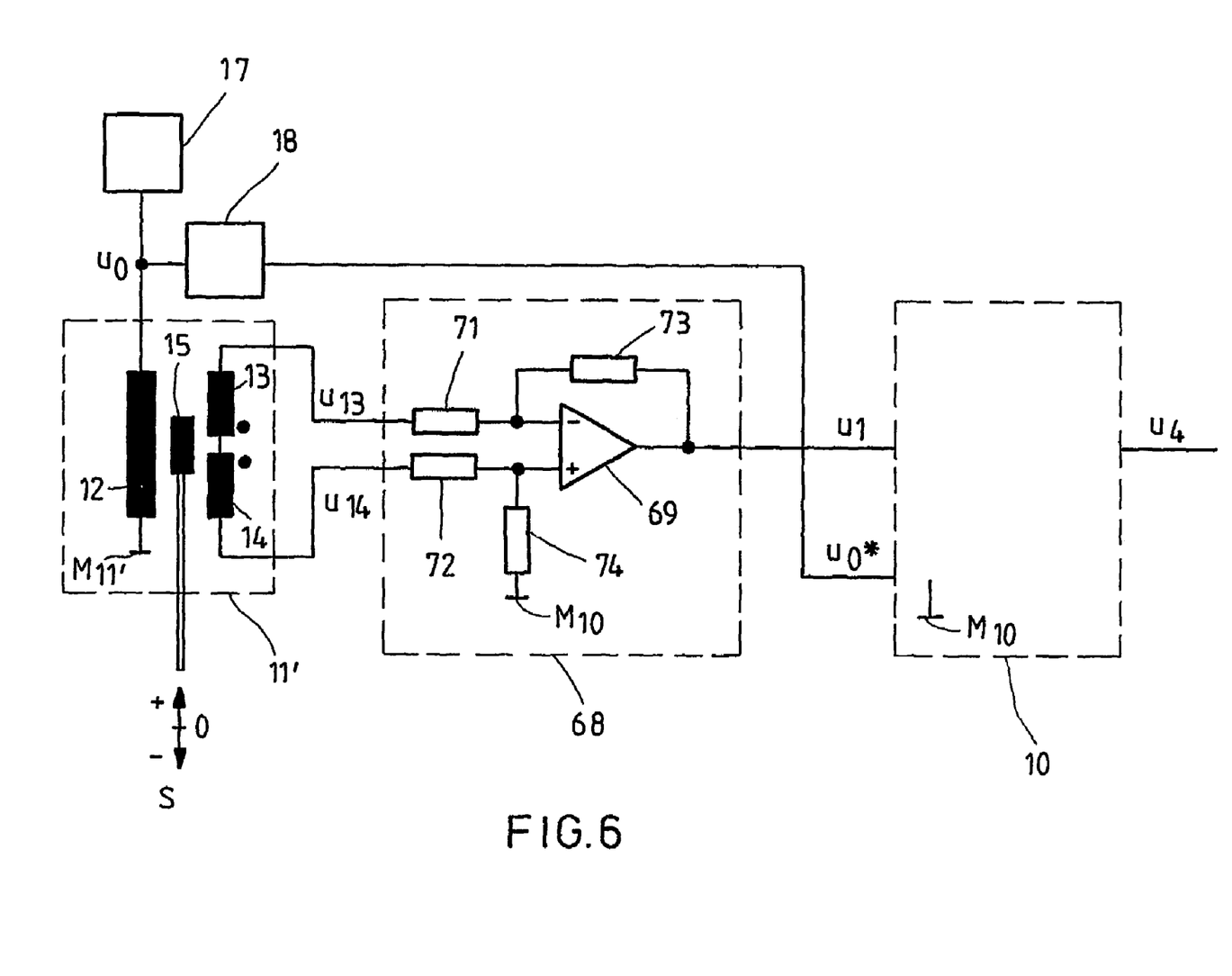
FIG. 6 shows a matching circuit, which is arranged between a sensor in the form of an inductive movement sensor and a circuit arrangement for rectifying the voltage which is supplied to it.

FIG. 6 shows a modification of the circuit arrangement shown in FIG. 1. A matching circuit 68 is arranged between an inductive movement sensor 11' and the ramp-generating circuit arrangement 10. The matching circuit 68 has an operational amplifier 69 and four resistors 71, 72, 73 and 74. The matching circuit 68 and the ramp-generating circuit arrangement 10 have a different reference potential to the movement sensor 11'. In FIG. 6, the reference potential of the ramp-generating circuit arrangement 10 is given the reference $M_{10}$, and the reference potential of the movement sensor 11' is given the reference $M_{11}'$. The matching circuit 68 has the same reference potential $M_{10}$ as the ramp-generating circuit arrangement 10. The output voltages of the movement sensor 11', given the references $u_{13}$ and $u_{14}$, are supplied to the resistors 71 and 72, respectively, as the input voltage. The matching circuit 68 converts the difference between the voltages $u_{13}$ and $u_{14}$ to the voltage $u_1$ which is based on the reference potential $M_{10}$. The voltages $u_1$ and $u_0^*$ are supplied, as in FIG. 1, to the input of the ramp-generating circuit arrangement 10. The output voltage of the ramp-generating circuit arrangement 10 is given the reference $u_4$, as in FIG. 1. The matching circuit 68 isolates the reference potentials of the movement sensor 11' from the ramp-generating circuit arrangement 10. In this case, the ratio of the resistors 71 and 73 determines the gain of the matching circuit 68. The gain may be less than 1, more than 1 or equal to 1. The gain makes it possible to normalize the signal level. As an alternative to the ramp-generating circuit arrangement 10 shown in FIG. 1, the ramp-generating circuit arrangement 48 shown in FIG. 5 can be used in FIG. 6.

Figure 7:
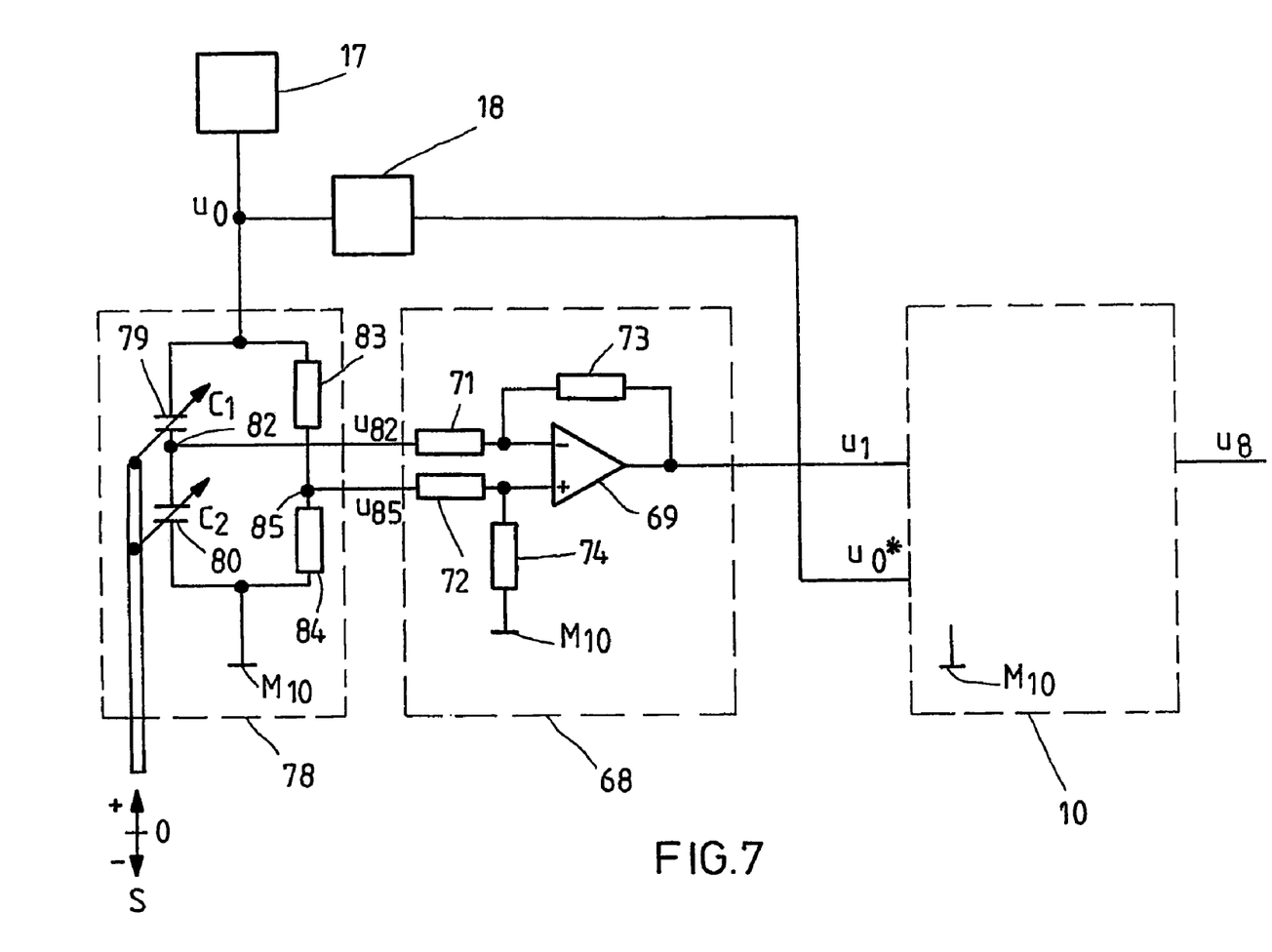
FIG. 7 shows a sensor in the form of a capacitive movement sensor and a matching circuit downstream thereof.

FIG. 7 shows a circuit arrangement corresponding to FIG. 6, in which the sensor for the non-electrical variable is in the form of a capacitive movement sensor 78. The capacitive movement sensor 78 is supplied from the output voltage $u_0$ of the oscillator 17. The capacitive movement sensor 78 has two series-connected capacitors 79 and 80. The capacitance of the capacitors is given the references $C_1$ and $C_2$, respectively. The common switching point of the capacitors 79 and 80 is provided with the reference 82. The non-electrical variable in the form of a movement distance s deflects the electrodes of the capacitors 79 and 80 mechanically such that their capacitances $C_1$ and $C_2$ change in opposition corresponding to the deflection. The voltage of the switching point 82 is given the reference $u_{82}$. It changes according to the movement distance s. The series circuit comprising two resistors 83 and 84 is arranged in parallel with the capacitors 79 and 80. The common switching point of the resistors 83 and 84 is provided with the reference 85. The voltage of the switching point 85 is given the reference $u_{85}$. It is determined by the ratio of the resistors 83 and 84. The output voltage of the capacitive movement sensor 78 is determined by the difference between the voltages $u_{82}$ and $u_{85}$. The voltages $u_{82}$ and $u_{85}$ are supplied to the matching circuit 68. The matching circuit 68 forms, from the voltages $u_{82}$ and $u_{85}$, the voltage $u_1$, which is supplied to the ramp-generating circuit arrangement 10 as an input voltage. The voltage $u_1$ thus corresponds to the difference between the voltages $u_{82}$ and $u_{85}$. In this exemplary embodiment, the reference potential of the movement sensor 78 is equal to the reference potential $M_{10}$ of the ramp-generating circuit arrangement 10 and of the matching circuit 68. As an alternative to the ramp-generating circuit arrangement 10 shown in FIG. 1, the ramp-generating circuit arrangement 48 shown in FIG. 5, may also be used in FIG. 7.

I claim:

1. A circuit for rectifying the output voltage of a sensor, supplied with an AC signal from an oscillator for sensing a non-electrical variable, wherein the amplitude and phase angle of the output voltage is a measure of the non-electrical variable, the rectifying circuit including a ramp-generating circuit; and wherein:
   the output voltage ($u_1$) of the sensor (11) is supplied to the ramp-generating circuit (10; 45; 48),
   the mathematical sign of the transmission behavior of the ramp-generating circuit (10; 45; 48) can be controlled, and
   the mathematical sign of the transmission behavior of the ramp-generating circuit (10; 45; 48) is controlled by a switching signal ($u_0^*$), whose flanks correspond to zero crossings of the output voltage ($u_1$) of the sensor (11).

2. The rectifying circuit as claimed in claim 1, further comprising a signal conditioner (18) that uses a comparator function and a dead time to convert the output voltage ($u_0$) of the oscillator (17) to the switching signal ($u_0^*$).

3. The reflecting circuit as claimed in claim 2, wherein the dead time of the signal conditioner (18) shifts the phase angle of the switching signal ($u_0^*$) with respect to an output voltage ($u_0$) of the oscillator (17) signal through an angle such that the flanks of the switching signal ($u_0^*$) correspond to the zero crossings of the output voltage ($u_1$) of the sensor (11).

4. The rectifying circuit as claimed in claim 2, further comprising an amplifier circuit, wherein
   the output voltage ($u_1$) of the sensor (11) is supplied to an amplifier circuit (20) having a gain with a controllable mathematical sign,
   the mathematical sign for the gain of the amplifier circuit (20) is controlled as a function of the switching signal ($u_0^*$), and
   a ramp generator (21; 38) is connected downstream of the amplifier circuit (20), no mathematical sign-inversion being carried out in the ramp generator (21; 38).

5. The rectifying circuit as claimed in claim 4, wherein:
   the output voltage ($u_1$) of the sensor (11) is supplied to the inverting input of a first operational amplifier (23) via a first resistor (24),
   the output voltage ($u_2$) of the first operational amplifier (23) is supplied to its inverting input via a second resistor (25),
   the output voltage ($u_1$) of the sensor (11) is supplied to the non-inverting input of the first operational amplifier (23) via a third resistor (26), and
   the non-inverting input of the first operational amplifier (23) is connected to the reference potential via a switch (27) which is controlled by a switching signal ($u_0^*$).

6. The rectifying circuit as claimed in claim 5, wherein the first (24) resistor and the second (25) resistor have the same resistance value.

7. The rectifying circuit as claimed in claim 4, wherein the ramp generator (21) has an inverting transmission behavior.

8. The rectifying circuit as claimed in claim 7, wherein:
the ramp generator (21) has a second (30) and a third (31) operational amplifier,
the non-inverting input of the second operational amplifier (30) is supplied with the output voltage ($u_2$) of the amplifier circuit (20) via a fourth resistor (32) and the output voltage ($u_4$) of the third operational amplifier (31) via a fifth resistor (33),
the inverting input of the second operational amplifier (30) is connected to the reference potential,
the inverting input of the third operational amplifier (31) is supplied its output voltage ($u_4$) via a capacitor (35) and the output voltage ($u_3$) of the second operational amplifier (30) via a sixth resistor (34), and
the non-inverting input of the third operational amplifier (31) is connected to the reference potential.

9. The rectifying circuit as claimed in claim 8, wherein the fourth (32) and the fifth (33) resistor have the same resistance value.

10. The rectifying circuit as claimed in claim 4, wherein the ramp generator (38) has a non-inverting transmission behavior.

11. The rectifying circuit arrangement as claimed in claim 10, wherein:
the ramp generator (38) has a second (30) and a third (31) operational amplifier,
the inverting input of the second operational amplifier (30) is supplied the output voltage ($u_2$) of the amplifier circuit (20),
the non-inverting input of the second operational amplifier (30) is supplied with the output voltage ($u_6$) of the ramp generator (38),
the inverting input of the third operational amplifier (31) is supplied with its output voltage ($u_6$) via a capacitor (35) and the output voltage ($u_5$) of the second operational amplifier (30) via a sixth resistor (34), and
the non-inverting input of the third operational amplifier (31) is connected to a reference potential.

12. The rectifying circuit arrangement as claimed in claim 10, wherein:
the output voltage ($u_2$) of the amplifier circuit (20) is supplied to the inverting input of the second operational amplifier (30) via a seventh resistor (41),
the output voltage ($u_2$) of the amplifier circuit (20) is supplied to the non-inverting input of the second operational amplifier (30) via an eighth resistor (42),
a ninth resistor (43) is arranged between the output of the third operational amplifier (31) and the non-inverting input of the second operational amplifier (30),
the inverting input of the third operational amplifier (31) is supplied its output voltage ($u_6$) via a capacitor (35) and the output voltage ($u_5$) of the second operational amplifier (30) via a sixth resistor (34), and
the non-inverting input of the third operational amplifier (31) is connected to the reference potential.

13. The rectifying circuit as claimed in claim 12, wherein the eighth (42) and the ninth (43) resistor have the same resistance value.

14. The rectifying circuit as claimed in claim 1, wherein the output voltage ($u_1$) of the sensor (11) is supplied to a controlled ramp generator (45; 48), which can be changed over between inverting and non-inverting transmission behavior, and
the mathematical sign of the transmission behavior is controlled as a function of the switching signal ($u_0^*$).

15. The rectifying circuit as claimed in claim 14, wherein:
the controlled ramp generator (45) has a second (30) and a third (31) operational amplifier,
the output voltage ($u_1$) of the sensor (11) is supplied to the inverting input of the second operational amplifier (30) via a seventh resistor (41),
a switch (46), which is controlled by the switching signal ($u_0^*$), is arranged between the inverting input of the second operational amplifier (30) and the reference potential,
the output voltage ($u_1$) of the sensor (11) is supplied to the non-inverting input of the second operational amplifier (30) via an eighth resistor (42),
the output voltage ($u_8$) of the controlled ramp generator (45) is supplied to the non-inverting input of the second operational amplifier (30) via a ninth resistor (43),
the inverting input of the third operational amplifier (31) is supplied its output voltage ($u_8$) via a capacitor (35) and the output voltage ($u_7$) of the second operational amplifier (30) via a sixth resistor (34), and
the non-inverting input of the third operational amplifier (31) is connected to the reference potential.

16. The rectifying circuit as claimed in claim 15, wherein the eighth (42) and the ninth (43) resistors have the same resistance value.

17. The rectifying circuit as claimed in claim 15, wherein:
a tenth resistor (51) is arranged between the output of the second operational amplifier (30) and the sixth resistor (34),
a connecting point (52) between the tenth resistor (51) and the sixth resistor (34) is connected, via a first diode (54), to a negative auxiliary voltage ($-U_H$) and, via a second diode (55), to a positive auxiliary voltage ($+U_H$) having the same value, and
the value for each of the auxiliary voltages ($-U_H$, $+U_H$) is smaller than the value for the output voltage ($u_7$) of the second operational amplifier (30) when the second operational amplifier is overloaded.

18. The rectifying circuit as claimed in claim 17, wherein a second capacitor (58) is arranged in parallel with a series circuit comprising the sixth (34) and the tenth (51) resistor.

19. The rectifying circuit as claimed in claim 1, wherein the ramp steepness of the ramp generator (21; 38; 45; 48) is greater than the maximum steepness of the useful signal of the output voltage ($u_1$) of the sensor (11; 11'; 78).

20. The rectifying circuit as claimed in claim 1, wherein at least one linear filter (50) is connected downstream of the ramp-generating circuit (10; 45; 48).

21. The rectifying circuit as claimed in claim 20, wherein the linear filter (50) is an active, second-order bandpass filter having single positive feedback.

22. The rectifying circuit as claimed in claim 20, wherein the linear filter (50) is in the form of a Bessel filter.

23. The rectifying circuit as claimed in claim 1, wherein a matching circuit (68) is arranged between the sensor (11'; 78) and the ramp-generating circuit (10), and amplifies the amplitude of the output voltage ($u_{13}-u_{14}$; $u_{85}-u_{82}$) of the sensor (11'; 78).

24. The rectifying circuit as claimed in claim 23, wherein the matching circuit (68) isolates reference potentials ($M_{11}$ and $M_{10}$, respectively) of the sensor (11') and the ramp-generating circuit (10).

25. The rectifying circuit as claimed in claim 23, wherein:
a first output voltage ($u_{13}$) of the sensor (11') is supplied to the inverting, input of a fourth operational amplifier (69) via an eleventh resistor (71), a second output voltage ($u_{14}$) of the sensor (11') is supplied to the non-inverting input of the fourth operational amplifier (69) via a twelfth resistor (72), the output of the fourth operational amplifier (69) is connected to the inverting input of the fourth operational amplifier (69) via a thirteenth resistor (73), and the non-inverting input of the fourth operational amplifier (69) is connected to a reference potential ($M_{10}$) via a fourteenth resistor (74).

26. The rectifying circuit as claimed in claim 1, wherein the sensor is an inductive movement sensor (11; 11'), and the amplitude and the phase angle of the output voltage ($u_1$; $u_{13}$–$u_{14}$) of the movement sensor (11, 11') is a measure of the deflection (s) of a ferromagnetic core (15).

27. The rectifying circuit as claimed in claim 1, wherein the sensor is a capacitive movement sensor (78), and the non-electrical variable (s) alters a capacitance ($C_1$, $C_2$) of the movement sensor (78) such that the amplitude and the phase angle of the output voltage ($u_{85}$–$u_{82}$) of the movement sensor (78) is a measure of the non-electrical variable (s).

* * * * *